US007897265B2

(12) United States Patent
Nardi et al.

(10) Patent No.: US 7,897,265 B2
(45) Date of Patent: Mar. 1, 2011

(54) LOW COST, ENVIRONMENTALLY FAVORABLE, CHROMIUM PLATE REPLACEMENT COATING FOR IMPROVED WEAR PERFORMANCE

(75) Inventors: Aaron T. Nardi, East Granby, CT (US); Blair A. Smith, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 549 days.

(21) Appl. No.: 11/653,525

(22) Filed: Jan. 16, 2007

(65) Prior Publication Data

US 2007/0172695 A1 Jul. 26, 2007

Related U.S. Application Data

(60) Provisional application No. 60/763,009, filed on Jan. 26, 2006.

(51) Int. Cl.
*B32B 15/04* (2006.01)
*B32B 15/16* (2006.01)
*C25D 3/56* (2006.01)

(52) U.S. Cl. ....................... 428/627; 428/639; 428/668; 428/678; 428/323; 428/328; 428/331; 428/935; 75/236

(58) Field of Classification Search ....................... None
See application file for complete search history.

(56) References Cited

U.S. PATENT DOCUMENTS

| | | | | |
|---|---|---|---|---|
| 2,594,933 | A | | 4/1952 | Knapp et al. |
| 2,643,221 | A | | 6/1953 | Brenner et al. |
| 3,152,974 | A | | 10/1964 | Zentner |
| 3,753,667 | A | | 8/1973 | Metzger et al. |
| 4,153,453 | A | * | 5/1979 | Hart et al. ...................... 420/94 |
| 4,305,792 | A | * | 12/1981 | Kedward et al. ............ 205/109 |
| 4,528,070 | A | | 7/1985 | Gamblin |
| 4,673,468 | A | | 6/1987 | Myers et al. |
| 5,154,816 | A | | 10/1992 | Martinou et al. |
| 5,558,758 | A | | 9/1996 | Foster |
| 5,881,972 | A | * | 3/1999 | Smith et al. ................. 244/121 |
| 5,966,585 | A | * | 10/1999 | Sue ............................ 428/555 |
| 6,040,551 | A | * | 3/2000 | Manz et al. ............ 219/121.65 |
| 6,067,784 | A | * | 5/2000 | Jordan ......................... 56/102 |
| 2005/0112399 | A1 | | 5/2005 | Gray et al. |
| 2007/0170068 | A1 | | 7/2007 | Datta et al. |

FOREIGN PATENT DOCUMENTS

JP 63282295 A * 11/1988

(Continued)

OTHER PUBLICATIONS

Japanese Office Action dated Aug. 3, 2009.

*Primary Examiner*—Aaron Austin
(74) *Attorney, Agent, or Firm*—Bachman & LaPointe, P.C.

(57) ABSTRACT

A coating which improves the wear performance of a part is described. The coating is applied over an article such as a part or a workpiece using an electroplating process. The coating broadly includes a cobalt material matrix with a hardness of at least 550 HV and a plurality of carbide particles distributed throughout the cobalt material matrix. The cobalt material matrix may be a cobalt-phosphorous alloy. The particles interspersed throughout the matrix may be chrome carbide or silicon carbide particles.

14 Claims, 6 Drawing Sheets

FOREIGN PATENT DOCUMENTS

| | | | |
|---|---|---|---|
| JP | 6093469 | A | 4/1994 |
| JP | 2005530926 | T | 10/2005 |
| WO | 2004001100 | A1 | 12/2003 |
| WO | WO 2004001100 | A1 * | 12/2003 |
| WO | 2007021332 | A2 | 2/2007 |

* cited by examiner

LOW COST, ENVIRONMENTALLY FAVORABLE, CHROMIUM PLATE REPLACEMENT COATING FOR IMPROVED WEAR PERFORMANCE

CROSS-REFERENCE TO RELATED APPLICATION(S)

This application claims the benefit of provisional patent application No. 60/763,009 filed Jan. 26, 2006, entitled LOW COST, ENVIRONMENTALLY FAVORABLE CHROMIUM PLATE REPLACEMENT COATING FOR IMPROVED WEAR PERFORMANCE.

BACKGROUND

The present disclosure relates to a coating for an article or a part, which coating provides improved wear performance.

Chromium plating has been used very successfully for over 50 years in the prevention of wear on a variety of components. One example involves hydraulic actuators which rely on a hard coating to prevent scoring and general wear of actuator piston shafts and actuator bores. Any damage to these surfaces can result in excessive seal leakage and premature failure.

High Velocity Oxy-Fuel (HVOF) tungsten carbide thermal spray processes have been used with great success as chromium plate replacements. However, thermal spray processes are limited primarily to line-of-sight applications and can cost up to three times that of chromium plate. The highest costs are incurred in housing bore applications where the bore length divided by diameter is greater than one.

Increasingly tighter restrictions on many known environmentally hazardous materials or processes have forced manufacturers to require only environmentally friendly processes be used in the manufacture of their own equipment and equipment which they purchase. Among these are processes which incorporate hexavalent chromium or hex-chrome.

Hex-chrome is the primary functional constituent found in chromium plating baths. These baths create a mist during the plating process containing hex-chrome, which must be captured and processed through a complex and costly waste treatment system prior to disposal. Additionally, parts removed from the plating baths must be water rinsed. The rinse water must be treated similarly to the captured mist as hazardous waste before the water can be appropriately discharged. Also, making up chromium plating baths exposes workers to the hazards of handling hexavalent chromium containing compounds.

Composite electro-plated nickel or cobalt platings containing hard particles such as silicon carbide or chromium carbide have had limited success in replacing chromium plate. While the hard carbide particles in these coatings prevent excessive abrasion, the soft nickel or cobalt plating matrix which holds the particles in place can be easily scratched causing an imperfect surface which could facilitate seal leakage. In addition, as the soft matrix wears, the carbide particles can become loose. Loss of a carbide particle leaves a void in the surface contributing toward seal leakage, and allows the hard carbide to act as a third body abrasive particle.

Hard platings, like electroless nickel-boron or electroless nickel-phosphorous, without hard particles added, have also been used with limited success. These finishes have traditionally been limited to a very thin buildup (less than 0.003 inches thick). Such a buildup cannot be machined significantly after deposition, limiting its use in dimensional restoration on worn surfaces. Even on new hardware tighter manufacturing tolerances are required in order to prevent machining through the plating. Without the addition of hard particles, these coatings still tend to wear more significantly than chrome plate or HVOF tungsten carbide. In addition, electroless nickel-phosphorous has been known to experience adhesive wear like galling, and the electroless nickel-boron tends to fail by brittle fracture of the columnar structure resulting in pull out of the coating.

Due to recent environmental regulations, there is a need to replace conventional chromium electroplate for all applications involving a wear resistant coating.

SUMMARY OF THE INVENTION

In accordance with the present disclosure, there is provided a coating for improving the wear performance of an article. The coating broadly comprises a cobalt material matrix with a hardness in the range of from 550 to 100 HV and a plurality of carbide particles throughout the cobalt material matrix.

Further in accordance with the present disclosure, there is provided an article having a coating broadly comprising a cobalt material matrix with a hardness in the range of from 550 to 1000 HV and a plurality of carbide particles throughout the cobalt material matrix.

Still further, there is provided a process for forming a coating on an article. The process broadly comprises the steps of providing an article to be coated, providing an electroplating bath solution having a chemistry of from about 180 to 210 g/l cobalt chloride, from about 0.05 to 2.0 g/l cobalt carbonate, from 45 to 55 g/l ortho-phosphoric acid, and from about 5.0 to 15 g/l of phosphorous acid, the electroplating bath solution providing step further comprising placing a volume of carbide particles in the bath solution sufficient to result in from about 15 to 30 vol % of carbide particles in a final coating, and placing the article in contact with the bath solution and applying a current to deposit the coating onto the article.

Other details of the low cost, environmentally friendly, chromium plate replacement coating for improved wear performance, as well as other objects and advantages attendant thereto, are set forth in the following detailed description and the accompanying drawings wherein like reference numerals depict like elements.

DETAILED DESCRIPTION OF THE PREFERRED EMBODIMENT(S)

In accordance with the present disclosure, there is provided a coating which improves the wear performance of a part. The coating is applied over the part or article using an electroplating process.

The coating broadly comprises a cobalt material matrix with a hardness of at least 550 HV and a plurality of carbide particles throughout the cobalt material matrix. The cobalt material matrix may have a hardness in the range of from 550 to 1000 HV. The cobalt material matrix may be a cobalt-phosphorous (CoP) alloy wherein phosphorous is present in an amount of from 4.0 to 6.0 wt % in the final coating. The carbide particles interspersed or distributed throughout the matrix of the final coating may be chrome carbide, silicon carbide particles, or other types of particles. In lieu of carbide particles, diamonds or diamond particles may be used. The carbide particles or other particles may be present in a range from about 15 to 30 vol % and may be distributed evenly throughout the cobalt matrix material. Each particle may have an average particle size in the range of from about 2.0 to 10 microns. The remainder of the final coating is cobalt.

Figure 2:
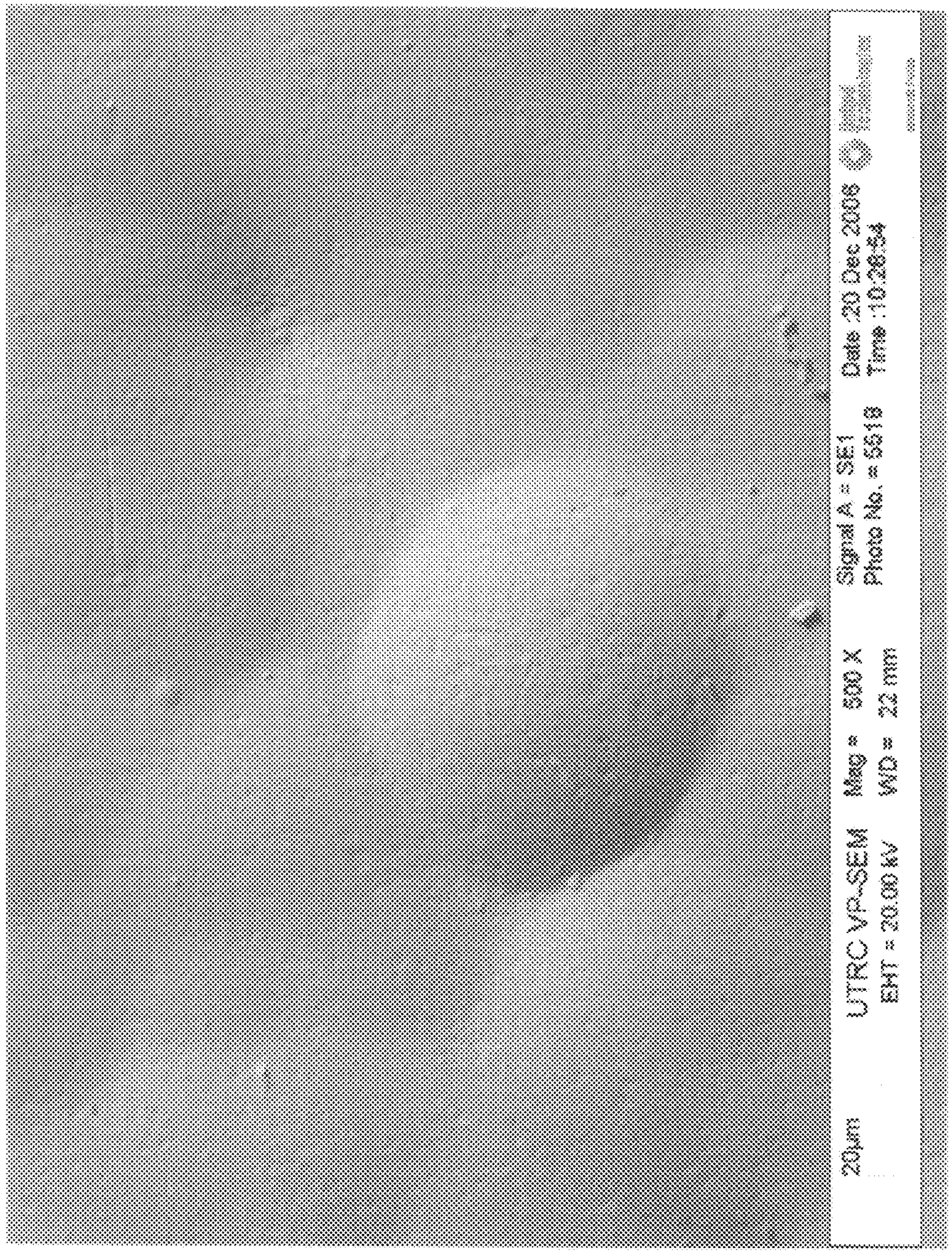
FIG. 2 is a SEM photomicrograph at 500× magnification of a cobalt-phosphorous coating without any particles.
Figure 3:
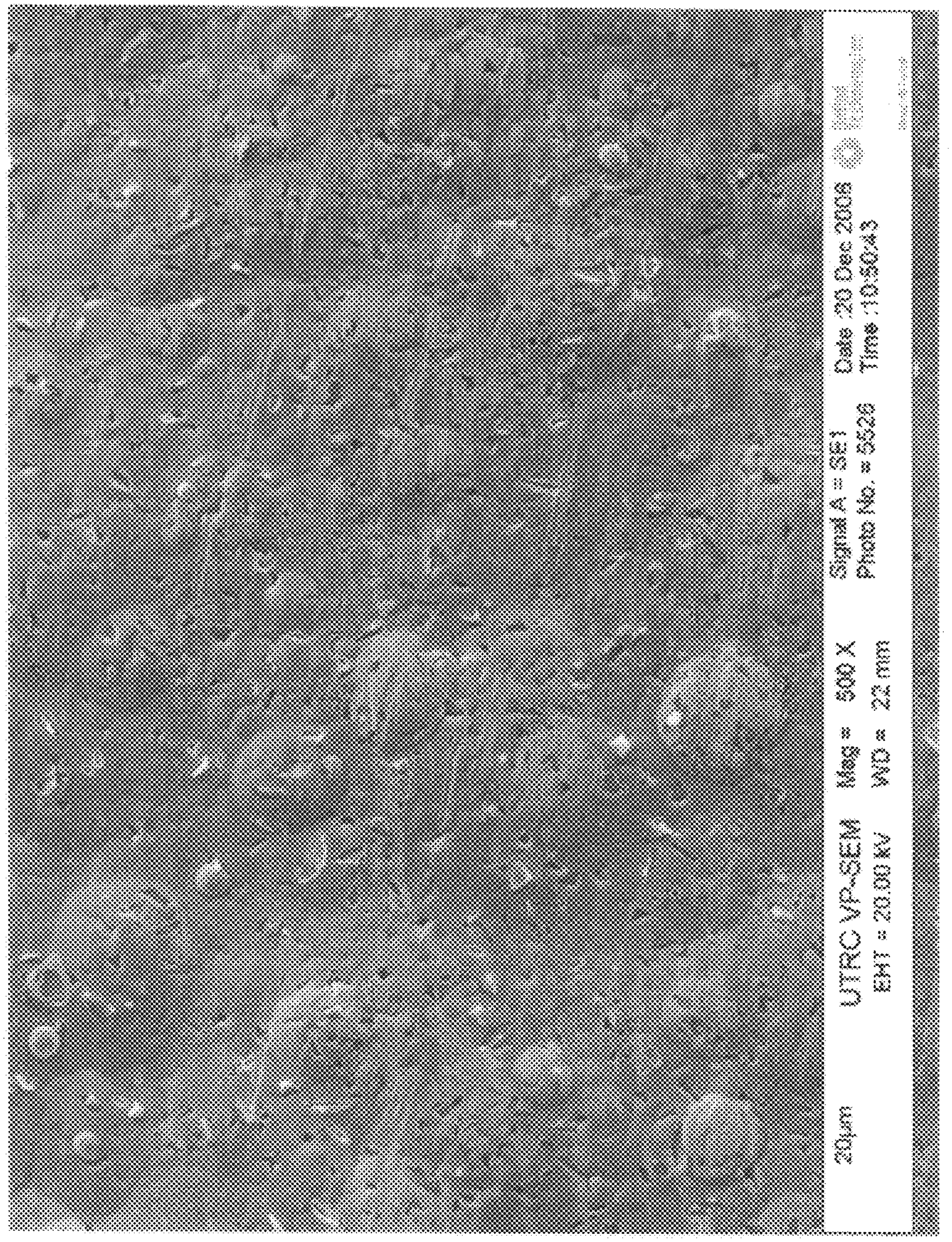
FIG. 3 is a SEM photomicrograph at 500× magnification of a cobalt-phosphorous coating containing silicon carbide particles.
Figure 4:
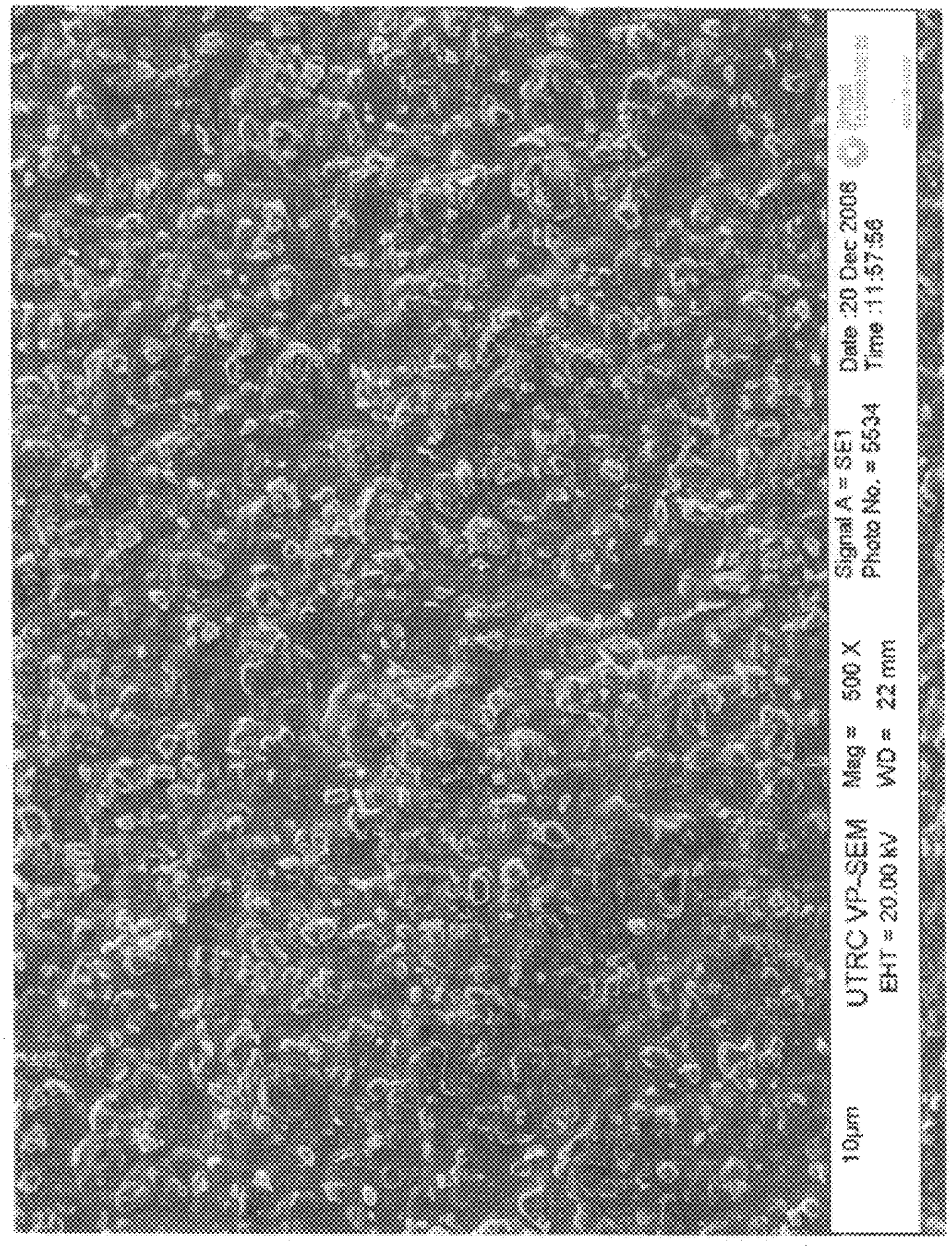
FIG. 4 is a SEM photomicrograph at 500× magnification of a cobalt-phosphorous coating containing chrome carbide particles.

FIG. 2 illustrates a CoP coating without any particles. FIG. 3 illustrates a CoP coating formed as described herein with silicon carbide particles. FIG. 4 illustrates a CoP coating containing chrome carbide particles. FIGS. 2-4 were taken in secondary electron mode to show topography.

The coating may be formed by using an electroplating technique. The electroplating bath may have a chemistry of from about 180 to 210 g/l cobalt chloride ($CoCl_2.6H_2O$), from about 0.05 to 2.0 g/l cobalt carbonate ($CoCO_3$) to neutralize/control pH, from about 45 to 55 g/l of ortho-phosphoric acid ($H_3PO_4$), and from about 5.0 to 15 g/l of phosphorous acid ($H_3PO_3$). The solution also contains a sufficient volume of carbide particles to result in from about 15 to 30 vol % of carbide particles in the final coating. The particles are agitated and co-deposited during the electroplating process. Agitation of the particles is desirable to provide an even distribution of carbide particles across the coating. The agitation may be carried out using any suitable means known in the art such as a stirring device. The bath may be maintained at a temperature in the range of from about 65 to 85 degrees Centigrade. The bath may also have a pH of from about 0.7 to 1.7. The coating may be deposited onto an article, a part, or a plurality of parts immersed in, or placed in contact with, the bath solution using a current density in the range of from about 45 to 300 amps/sq. ft. One or more anodes may be used to perform the electroplating deposition onto the part. Each anode may be formed from a consumable cobalt material or an inert material such as platinum or graphite. The as-deposited coating may have a hardness in the range of from about 550 to 650 HV. To increase the hardness of the coating and in particular the hardness of the cobalt phosphorous matrix, the part with the deposited coating may be subjected to a heat treatment a temperature in the range of from about 200 to 400 degrees Centigrade for a time period in the range of from about 1.0 to about 2.0 hours. The heat treatment may be carried out using any suitable heating apparatus known in the art such as a furnace and any suitable atmosphere. This heat treatment is capable of producing a coating with a cobalt phosphorous matrix and distributed carbide particles where the matrix has a hardness in the range of from about 650 to 1000 HV.

The process for forming the coating is advantageous in that it encompasses the favorable attributes of electrodeposition, i.e. is not limited to line of sight application, and can be built up to account for grinding and tolerancing, while eliminating the associated environmental hazards of conventional chromium electroplate.

EXAMPLE

Figure 5:
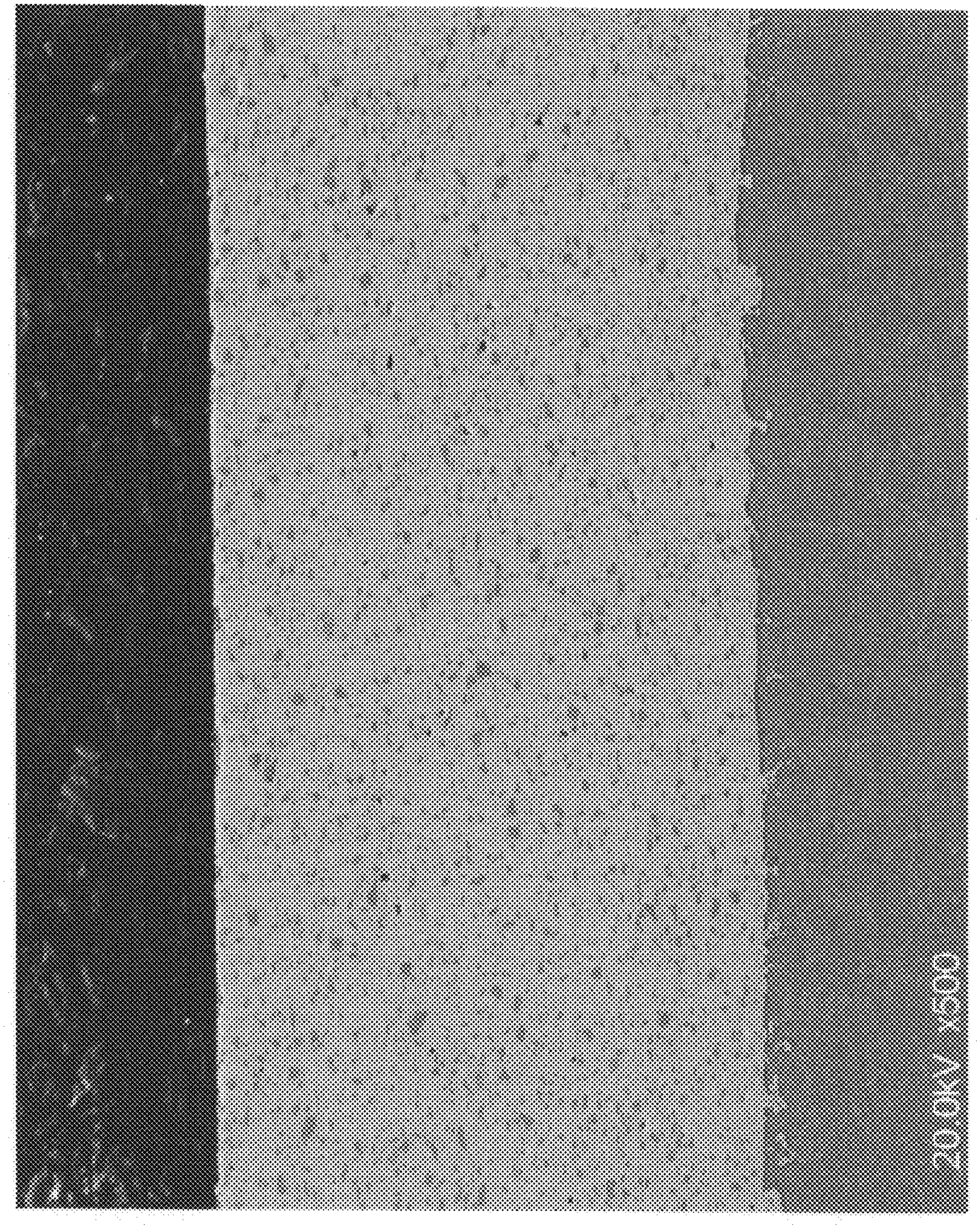
FIG. 5 is a cross sectional photomicrograph of the chrome carbide containing coating which was tested as described hereinafter.
Figure 6:
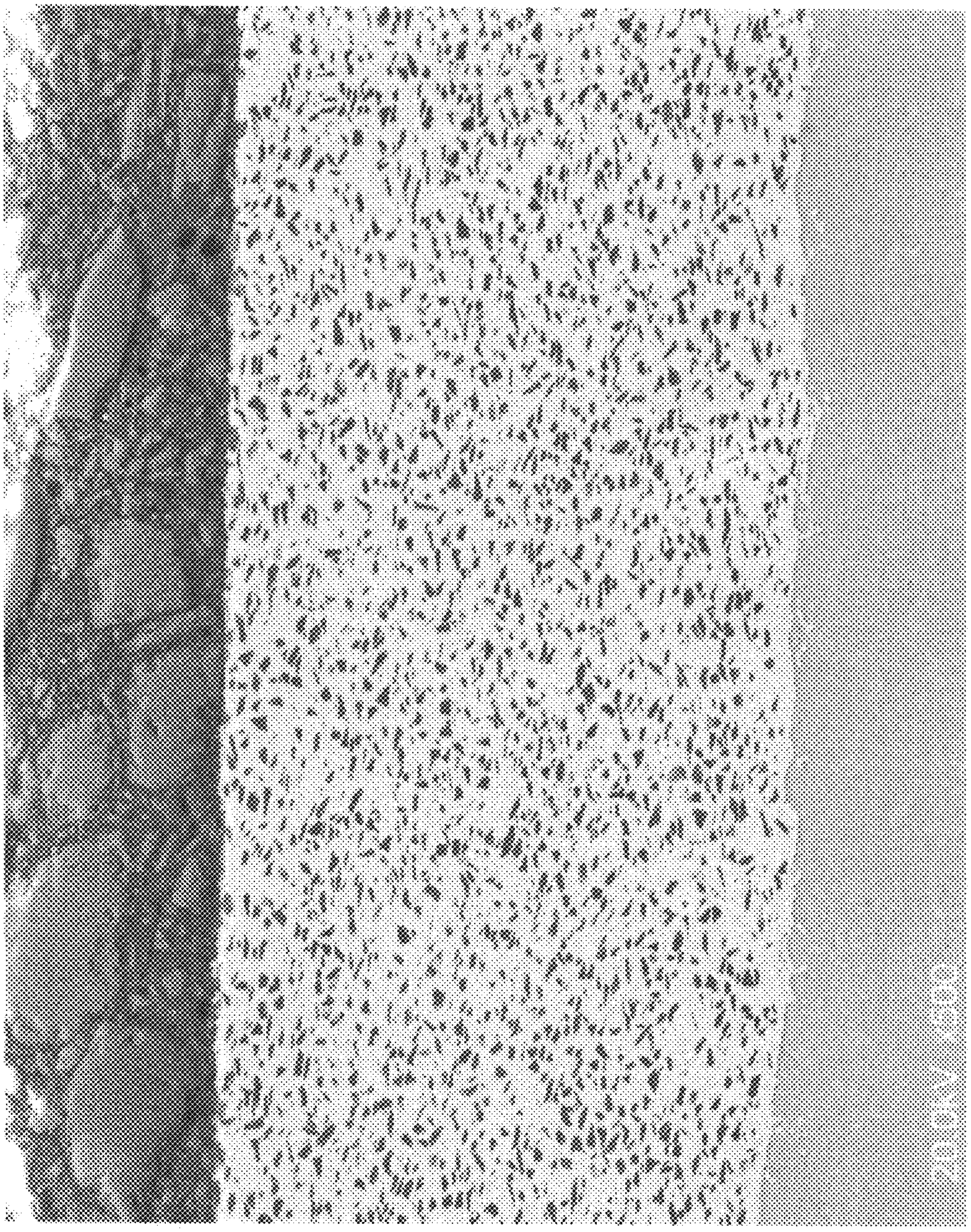
FIG. 6 is a cross sectional photomicrograph of the silicon carbide containing coating which was tested as described hereinafter.

A coating as described herein was tested along side a Tribaloy T-400 Plasma spray coating, which currently serves as a chrome plate alternative in select applications. The test consisted of coating an actuator bore test housing and cycling a piston within a bore a sufficient number of times to simulate the life of the hydraulic actuator. In this case, the actuator piston head was coated with an HVOF (High Velocity Oxy-Fuel) applied tungsten carbide cobalt coating. The actuator bore substrate was titanium, the piston head seal was a PTFE based elastomer energized cap seal, and the actuator test fluid was an aliphatic hydrocarbon with properties consistent with jet fuel. The piston head was side loaded against the actuator bore with a load of 500 pounds and he pressure differential across the piston head seal was 2800 psi. The motion of the piston included both dithering −0.010 inches to +0.010 inches and stroking −0.25 inches to +0.25 inches. The Tribaloy coating failed at the end of the test due to catastrophic failure of the coating. This failure consisted of the coating wearing away 0.003 to 0.0035 inches at the piston head location until the remaining coating was 0.0005 to 0.001 inches thick at which point the coating delaminated. The PTFE cap seal weight loss was 0.1102 grams. The coating of the present invention was tested with (1) a coating having chrome carbide particles and (2) a coating having silicon carbide particles. FIG. 5 illustrates the chrome carbide containing coating. FIG. 6 illustrates the silicon carbide containing coating. The photomicrographs are cross sectional photographs. Both coatings were heat treated at 400 degrees Fahrenheit for 1.0 hour. Under the same test conditions, the chrome carbide containing coating exhibited wear of 0.000004 inches deep at the piston contact location and reduced the seal weight loss to 0.0188 grams. The coating containing silicon carbide particles exhibited wear of 0.000008 inches at the piston head location and increased the seal weight loss to 0.1363 grams. Therefore, the silicon carbide containing coating has excellent wear resistance. The chrome carbide containing coating is particularly suited for seal applications.

The coatings described herein containing carbide particles have significant advantages in mechanical properties over chrome plate and other platings. Testing of strain threshold or the strain required to crack the coating under monotonic loading was performed. This property has been found at least to provide a reliable ranking for fatigue performance of brittle coatings and in some cases to be used successfully for prediction of fatigue properties of coatings. In the as-plated condition both chrome carbide and silicon carbide containing coatings exhibited a strain threshold of 0.0065 in/in. After a 450 degree Fahrenheit heat treat for 2.0 hours the strain threshold of the chrome carbide containing coating was 0.005 in/in., while the silicon carbide containing coating was 0.0025 in/in. All of these results compare favorably to chrome plate which has a strain threshold of 0.0011 in/in. and electroless nickel-boron with a strain threshold of 0.00065 in/in. Additionally, both chrome carbide and silicon carbide containing coatings as plated and chrome carbide containing heat treated samples exhibited strain threshold values comparable to the most fatigue resistant HVOF or Super D-Gun tungsten carbide coating which are typically in the range of 0.005 to 0.006 in/in.

Figure 1:
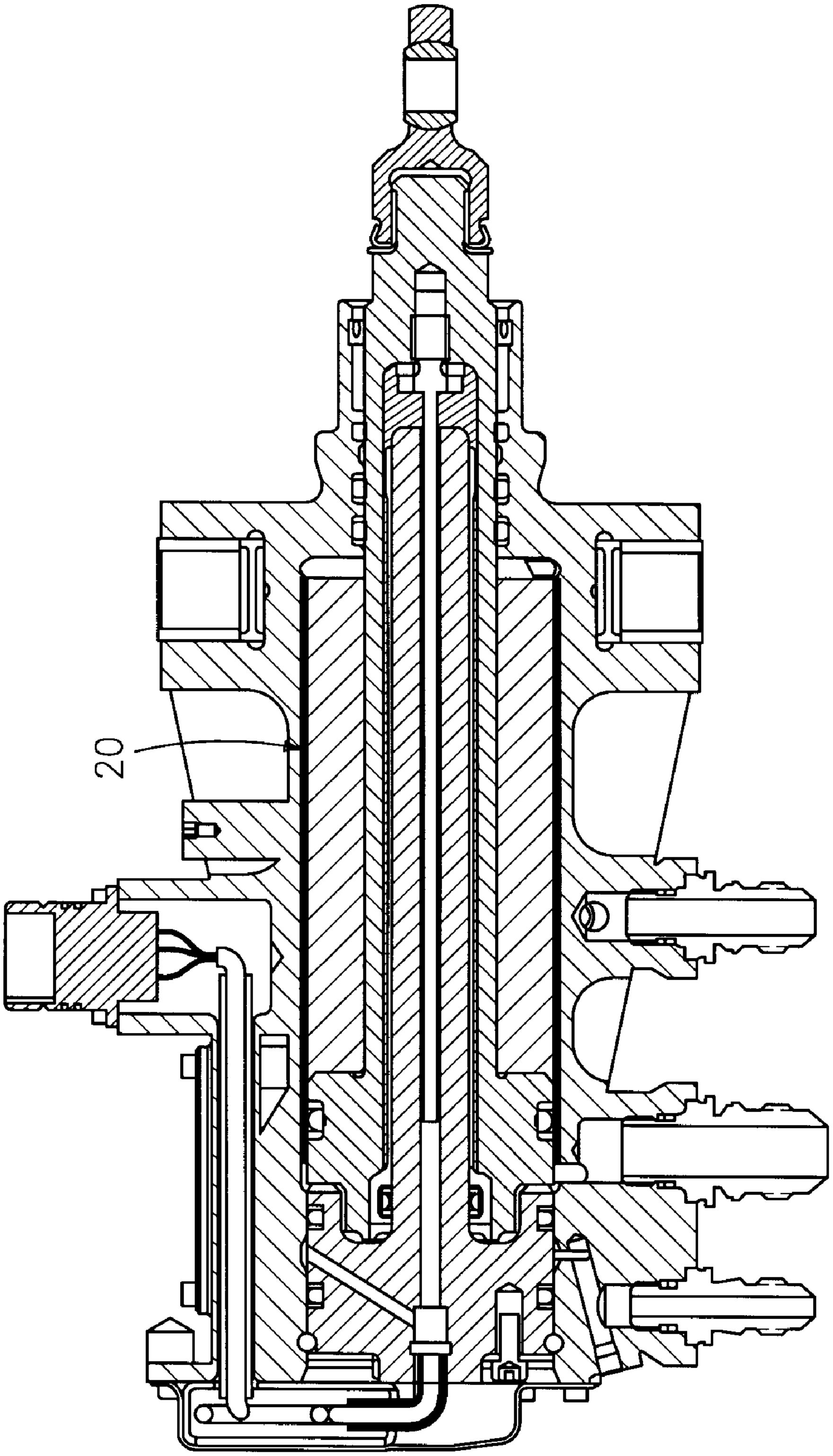
FIG. 1 is a cross sectional view of an actuator.

The coatings described herein may be used in a wide variety of applications. For example, the coatings may be used as an actuator bore coating 20 as shown in FIG. 1. A coating formed as described herein may also be used as a coating for propeller domes, propeller yokes, propeller anti-torque arms, landing gear, fuel control bores, gun barrels, and other applications where a hard coating is desirable.

It is apparent that there has been provided in accordance with the present disclosure a low cost, environmentally favorable, chromium plate replacement coating for improved wear performance which fully satisfies the objects, means, and advantages set forth hereinbefore. While the coatings have been described in the context of specific embodiments thereof, other unforeseeable alternatives, modifications, and variations may become apparent to those skilled in the art having read the foregoing description. Accordingly, it is intended to embrace those alternatives, modifications, and variations as fall within the broad scope of the appended claims.

What is claimed is:

1. A coating for improving the wear performance of an article, said coating comprising:

a cobalt material matrix with a hardness in the range of 550 to 1000 HV;

said cobalt material matrix consisting of a cobalt phosphorous alloy;

said phosphorous in the final coating being present in an amount of from 4.0 to 6.0 wt %; and a plurality of carbide particles selected from the group consisting of chrome carbide particles and silicon carbide particles throughout the cobalt material matrix, said carbide particles having an average particle size in the range of from 2.0 to 10 microns.

2. The coating of claim 1, wherein said carbide particles are present in an amount in the range of from 15 to 30 vol %.

3. The coating of claim 1, wherein said matrix has a hardness in the range of from 550 to 650 HV.

4. The coating of claim 1, wherein said matrix has a harness in the range of from 650 to 1000 HV.

5. An article having a coating comprising a cobalt material matrix with a hardness in the range of 550 to 1000 HV, said cobalt material matrix consisting of a cobalt phosphorous alloy;

said phosphorous in the final coating being present in an amount from 4.0 to 6.0 wt %; and a plurality of carbide particles selected from the group consisting of chrome carbide particles and silicon carbide particles throughout the cobalt material matrix, each said carbide particle having an average particle size in the range of from 2.0 to 10 microns.

6. The article of claim 5, wherein said article comprises an actuator bore.

7. The article of claim 5, wherein said article comprises a propeller dome.

8. The article of claim 5, wherein said article comprises a propeller yoke.

9. The article of claim 5, wherein said article comprises a propeller anti-torque arm.

10. The article of claim 5, wherein said article comprises a fuel control bore.

11. The article of claim 5, wherein said article comprises a gun barrel.

12. The article of claim 5, wherein said carbide particles are present in an amount in the range of from 15 to 30 vol %.

13. The article of claim 5, wherein said matrix has a hardness in the range of from 550 to 650 HV.

14. The article of claim 5, wherein said matrix has a hardness in the range of from 650 to 1000 HV.

* * * * *